(12) United States Patent
Yoshida

(10) Patent No.: US 7,575,615 B2
(45) Date of Patent: Aug. 18, 2009

(54) PROCESS FOR PREPARING A POLISHING COMPOSITION

(75) Inventor: Hiroyuki Yoshida, Wakayama (JP)

(73) Assignee: Kao Corporation, Tokyo (JP)

(*) Notice: Subject to any disclaimer, the term of this patent is extended or adjusted under 35 U.S.C. 154(b) by 108 days.

(21) Appl. No.: 11/477,952

(22) Filed: Jun. 30, 2006

(65) Prior Publication Data

US 2006/0245995 A1    Nov. 2, 2006

Related U.S. Application Data

(62) Division of application No. 11/126,339, filed on May 11, 2005, now abandoned.

(30) Foreign Application Priority Data

Jun. 14, 2004    (JP)    ............... 2004-175562

(51) Int. Cl.
*C09G 1/02*    (2006.01)
*C09G 1/04*    (2006.01)
*C09K 3/14*    (2006.01)
*C01B 33/20*    (2006.01)
*B24D 3/02*    (2006.01)

(52) U.S. Cl. .................... 51/308; 106/3; 438/691; 438/692; 438/693; 516/9

(58) Field of Classification Search .............. 51/308; 106/3; 438/690–694; 516/9; 423/326
See application file for complete search history.

(56) References Cited

U.S. PATENT DOCUMENTS

| 5,226,930 A | 7/1993 | Sasaki |
| 5,352,277 A | 10/1994 | Sasaki |
| 6,139,763 A | 10/2000 | Ina et al. |
| 2003/0041526 A1* | 3/2003 | Fujii et al. .................... 51/307 |

FOREIGN PATENT DOCUMENTS

| GB | 2168993 A | 7/1986 |
| JP | 2001269857 | 10/2001 |

OTHER PUBLICATIONS

English Language Abstract of JP-A-2001-269857 (Oct. 2, 2001).

* cited by examiner

*Primary Examiner*—Michael A Marcheschi
(74) *Attorney, Agent, or Firm*—Birch, Stewart, Kolasch and Birch, LLP

(57) ABSTRACT

The present invention relates to a process for preparing a polishing composition comprising a colloidal silica prepared from a silicate. The first step involves adjusting the pH of a silica dispersion comprising colloidal silica, having an average particle size of primary particles of 1 nm or more and less than 40 nm, to a range of from 10 to 14. The second step involves re-adjusting the pH of the silica dispersion obtained in the first step to a range of from 1 to 6. A density of silanol groups is formed on the surface of the colloidal silica that is from 0.06 to 0.3 mmol per 1 g of the colloidal silica.

5 Claims, No Drawings

PROCESS FOR PREPARING A POLISHING COMPOSITION

The present application is a 37 C.F.R. §1.53(b) divisional of U.S. patent application Ser. No. 11/126,339 filed May 11, 2005 (now abandoned), which claims priority to Japanese Patent Application No. 2004-175562, filed Jun. 14, 2004, the entire contents of which are hereby incorporated by reference and for which priority is claimed under 35 U.S.C. § 120.

FIELD OF THE INVENTION

The present invention relates to a polishing composition, a process for preparing a polishing composition, a method for reducing nano scratches of a substrate and a method for manufacturing a substrate, each method including the step of polishing the substrate with the polishing composition.

BACKGROUND OF THE INVENTION

In recent memory hard disk drives, high storage capacity and miniaturization have been demanded. In order to increase the recording density, it has been urged to lower the flying height of a magnetic head and to reduce the unit recording area. Along with this trend, the surface qualities required after polishing have become severely assessed every year even in a manufacturing step for a substrate for a magnetic disk. In order to satisfy the lowering of flying height of the magnetic head, the surface roughness, the microwaviness, the roll-off and projections are required to be reduced, and in order to satisfy the reduction in unit recording area, the acceptable number of scratches per one side of the substrate has been reduced, and the sizes and depths of the scratches have become increasingly smaller.

Also, in the field of semiconductors, highly integrated circuits and higher speed at the operating frequencies have been advanced, and the production of thinner wiring is required especially in highly integrated circuits. As a result, in the method for manufacturing a substrate for semiconductors, since the focal depth becomes more shallow with the increase in resolution required for an exposure device during the exposure of a photoresist, even more improvement in surface smoothness and planarization is desired.

On the other hand, improvement in the production efficiency of the substrate has been increasingly required over the years, so that a substrate having excellent surface smoothness and being capable of being polished in a short period of time has been desired.

In order to meet such requirements, a polishing composition capable of improving surface smoothness of a substrate by using a colloidal silica prepared in accordance with an alkoxysilane method as an abrasive is disclosed in JP-2001-269857 A. However, the improvement cannot be said to be satisfactory for a substrate for high recording density.

SUMMARY OF THE INVENTION

The present invention relates to:
[1] a polishing composition containing a colloidal silica prepared from a silicate, the colloidal silica having an average particle size of primary particles of 1 nm or more and less than 40 nm, and water, wherein a density of silanol group on the surface of the colloidal silica is from 0.06 to 0.3 mmol per 1 g of the colloidal silica;
[2] a process for preparing the polishing composition as defined in the above [1], including the steps of:

step (1): adjusting a pH of a silica dispersion containing the colloidal silica having an average particle size of primary particles of 1 nm or more and less than 40 nm to a range of from 10 to 14;
step (2): re-adjusting a pH of the silica dispersion obtained in the step (1) to a range of from 1 to 6;
[3] a method for reducing nano scratches of a substrate, comprising the step of polishing a substrate to be polished with a polishing composition comprising a colloidal silica prepared from a silicate, the colloidal silica having an average particle size of primary particles of 1 nm or more and less than 40 nm, and water, wherein a density of silanol group on the surface of the colloidal silica is adjusted to a range from 0.06 to 0.3 mmol per 1 g of the colloidal silica; and
[4] a method for manufacturing a substrate, comprising the step of polishing a substrate to be polished with a polishing composition comprising a colloidal silica prepared from a silicate, the colloidal silica having an average particle size of primary particles of 1 nm or more and less than 40 nm, and water, wherein a density of silanol group on the surface of the colloidal silica is adjusted to a range from 0.06 to 0.3 mmol per 1 g of the colloidal silica.

DETAILED DESCRIPTION OF THE INVENTION

The present invention relates to a polishing composition giving a polished object a small surface roughness and being capable of remarkably reducing nano scratches, a process for preparing the polishing composition, a method for reducing nano scratches of a substrate with the polishing composition, and a method for manufacturing a substrate having a small surface roughness and remarkably reduced nano scratches.

As a result of intensive studies on the requirements for achieving surface smoothness required for high density or high integration of a substrate for precision parts such as a memory hard disk substrate or a semiconductor substrate, the generation of conventionally undetectable "nano scratches" (fine scratches on a substrate surface having a depth of 10 nm or more and less than 100 nm, a width of 5 nm or more and less than 500 nm, and a length of 100 μm or more) prevents the memory hard disk substrate from being highly densified, and the semiconductor substrate from being highly integrated. Furthermore, it has been found for the first time in the present invention that the above-mentioned nano scratches can be reduced by using a colloidal silica prepared by using a silicate such as sodium silicate, and controlling the density of silanol group which is present on the surface of the colloidal silica within a specified range. The present invention has been accomplished thereby.

There are exhibited some effects that by using the polishing composition of the present invention, for example, in the polishing step of a substrate for precision parts for high density or high integration, the polished substrate has excellent surface smoothness and the conventionally undetectable fine nano scratches can be remarkably reduced, whereby a high-quality substrate for precision parts such as a memory hard disk substrate or a semiconductor substrate can be efficiently manufactured.

These and other advantages of the present invention will be apparent from the following description.

A feature of the polishing composition of the present invention resides in that the polishing composition contains a colloidal silica prepared from a silicate, the colloidal silica having an average particle size of primary particles of 1 nm or more and less than 40 nm, and water, wherein a density of silanol group on the surface of the colloidal silica is from 0.06 to 0.3 mmol per 1 g of the colloidal silica. Since the polishing composition has the above feature, excellent surface properties can be accomplished, and nano scratches which could cause defects can be remarkably reduced. The nano scratch is an especially important property for increasing the density of the memory hard disk substrate or integration of the semiconductor substrate. Therefore, by using the polishing composition of the present invention, a high-quality memory hard disk substrate or semiconductor substrate having excellent surface properties can be manufactured.

The mechanism for reducing the above-mentioned nano scratches is not elucidated. Although not wanting to be limited by theory, it is presumably due to the fact that the aggregation of the colloidal silica particles with each other is suppressed by adjusting the density of the silanol group present on the surface of the colloidal silica within a specified range, whereby the nano scratches can be reduced.

The colloidal silica contained in the polishing composition of the present invention is a colloidal silica prepared by a so-called silicate method, using a silicate such as sodium silicate or potassium silicate as a raw material. Although the form of the colloidal silica is not particularly limited, the colloidal silica is in the form of, for example, a sol or gel state.

The silicate method includes a method including the step of subjecting a silicate used as a raw material to a condensation reaction to give silica particles (water glass method), and the like.

In the present invention, by using the colloidal silica prepared according to the silicate method, there is an advantage that the nano scratches can be remarkably reduced as compared to the case where a colloidal silica obtained by a conventional alkoxysilane method or a fumed silica obtained by a dry method is used.

The average particle size of the primary particles of the above-mentioned colloidal silica, regardless of whether or not one or more kinds of colloidal silicas are used in admixture, is 1 nm or more and less than 40 nm. The average particle size is preferably 3 nm or more, more preferably 5 nm or more, from the viewpoint of increasing the polishing rate. Also, the average particle size is preferably 35 nm or less, more preferably 30 nm or less, even more preferably 25 nm or less, even more preferably 20 nm or less, from the viewpoint of reducing the surface roughness (average surface roughness: Ra, peak-to-valley value: Rmax). Therefore, the average particle size of the primary particles is preferably from 1 to 35 nm, more preferably from 3 to 30 nm, even more preferably from 5 to 25 nm, even more preferably from 5 to 20 nm, from the viewpoint of economically reducing the surface roughness. Further, when the primary particles are aggregated to form secondary particles, the average particle size of the secondary particles is preferably from 5 to 150 nm, more preferably from 5 to 100 nm, even more preferably from 5 to 80 nm, even more preferably from 5 to 50 nm, even more preferably from 5 to 30 nm, from the viewpoint of increasing the polishing rate, and from the viewpoint of reducing the surface roughness of the substrate in the same manner as above.

Incidentally, the average primary particle size of the above-mentioned colloidal silicas, regardless of whether or not one or more kinds of the above-mentioned colloidal silicas are used in admixture, is determined by obtaining a particle size at 50% counted from a smaller particle size side of the primary particles in a cumulative particle size distribution on the volume basis (D50) by using an image observed with a scanning electron microscope (magnification preferably from 3000 to 100000), and this D50 is defined as an average particle size of the primary particles. In addition, the average particle size of the secondary particles can be determined as a volume-average particle size using a laser diffraction method.

In addition, the above-mentioned colloidal silica has a particle size distribution, regardless of whether or not one or more kinds of the colloidal silicas are used in admixture, such that D90/D50 is preferably from 1 to 3, more preferably from 1.3 to 3, from the viewpoint of achieving the reduction of nano scratches, the reduction of surface roughness, and the high polishing rate. Here, D90 refers to a particle size at 90% counted from a smaller particle size side of the primary particles in a cumulative particle size distribution on the volume basis (D90) by using an image observed with a scanning electron microscope (magnification preferably from 3000 to 100000).

The content of the colloidal silica is preferably 0.5% by weight or more, more preferably 1% by weight or more, even more preferably 3% by weight or more, even more preferably 5% by weight or more, of the polishing composition, from the viewpoint of increasing the polishing rate. In addition, the content of the colloidal silica is preferably 20% by weight or less, more preferably 15% by weight or less, even more preferably 13% by weight or less, even more preferably 10% by weight or less, of the polishing composition, from the viewpoint of improving the surface properties. Specifically, the content of the colloidal silica is preferably from 0.5 to 20% by weight, more preferably from 1 to 15% by weight, even more preferably from 3 to 13% by weight, even more preferably from 5 to 10% by weight, of the polishing composition, from the viewpoint of economically improving the surface properties.

In the present invention, the density of the silanol group on the surface of the colloidal silica is from 0.06 to 0.3 mmol/g, and the density is preferably from 0.08 to 0.3 mmol/g, more preferably from 0.1 to 0.3 mmol/g, even more preferably from 0.15 to 0.3 mmol/g, from the viewpoint of reducing nano scratches.

Incidentally, the density of the silanol group can be determined by the method described later.

The silanol group on the surface of the colloidal silica as referred herein is a hydroxyl group that is present on the surface of the colloidal silica in the above-mentioned polishing composition, the hydroxyl group being directly bonded to a silicon atom of the colloidal silica, and its configuration or conformation is not particularly limited. Also, the conditions for forming the silanol group and the like are not limited.

The density of the silanol group as referred to herein can be determined by directly titrating a polishing composition with hydrochloric acid using a potentiometric titrator, and the number of silanol groups (unit: mmol) obtained from the reflection point of a curve obtained by taking a differential of the titration curve is divided by the weight (unit: g) of the colloidal silicas contained in the polishing composition, whereby the density of silanol group per 1 g of the colloidal silica (unit: mmol/g) can be obtained. Here, when the polishing composition shows a pH of 6 or more and 14 or less, the number of the silanol groups can be quantified by titrating with hydrochloric acid. On the other hand, when the polishing composition has a pH of less than 6, the pH is adjusted to 9 with an aqueous solution of a strong base such as sodium hydroxide, and thereafter the number of the silanol groups can be quantified by titrating with hydrochloric acid using a potentiometric titrator.

Although the function mechanisms of the metal elements in the polishing composition are not elucidated, it is preferable that the content of the metal elements in the polishing composition is a specified content in order to reduce nano scratches. For example, the content of the metal elements is preferably from 0.001 to 2% by weight, more preferably from 0.001 to 1% by weight, even more preferably from 0.01 to 1% by weight, even more preferably from 0.01 to 0.5% by weight, even more preferably from 0.01 to 0.1% by weight, of the polishing composition.

The metal element includes alkali metals such as Na and K; and alkaline earth metals such as Mg and Ca. These metal elements are derived from the preparation of the colloidal silica in many cases (including the case where the surface of the colloidal silica is modified with aluminum or the like). In this case, the content of the metal elements derived from the colloidal silica is, for example, preferably from 0.001 to 0.2% by weight of the polishing composition, and the content is more preferably from 0.001 to 0.1% by weight, even more preferably from 0.005 to 0.1% by weight, even more preferably from 0.005 to 0.05% by weight, of the polishing composition. The content of the metal elements derived from the colloidal silica does not include the metal elements involved in the adjustment of the pH of the silica dispersion in the present invention.

In order to adjust the content of the metal elements derived from the colloidal silica as mentioned above within the specified range, the content of the metal elements can be adjusted by the concentration of the silicate during the preparation of the colloidal silica.

Among them, in the case where the metal element includes Na and/or K, the total amount of N and K is preferably from 0.001 to 0.2% by weight, more preferably from 0.001 to 0.1% by weight, even more preferably from 0.005 to 0.1% by weight, even more preferably from 0.005 to 0.05% by weight, of the polishing composition, from the viewpoint of reducing the nano scratches in the same manner as above.

As the medium of the polishing composition in the present invention, water is used. Water includes ion exchanged water, distilled water, ultrapure water and the like. In addition, in the present invention, in addition to water, a water-soluble organic solvent can be used as a medium. The water-soluble organic solvent includes primary to tertiary alcohols, glycols and the like. The content of this medium is preferably from 69 to 99% by weight, more preferably from 79 to 98% by weight, of the polishing composition.

In addition, in the polishing composition of the present invention, other components can be formulated as occasion demands. The other components include, for example, an abrasive generally used for polishing excluding the above-mentioned colloidal silica, such as aluminum oxide and cerium oxide; an inorganic acid or organic acid; an inorganic base or organic base, such as an aqueous ammonia, sodium hydroxide or potassium hydroxide; an acidic salt, a neutral salt or a basic salt; a surfactant; an oxidizing agent such as hydrogen peroxide; a radical scavenger; a clathrate compound; an anticorrosive agent; a defoaming agent; an antibacterial agent and the like. Among them, the inorganic acid or organic acid, the acidic salt, and the oxidizing agent such as hydrogen peroxide are preferable, from the viewpoint of increasing the polishing rate and reducing the surface roughness of the substrate. The content of these other components is preferably from 0 to 10% by weight, more preferably from 0 to 5% by weight, of the polishing composition, from the viewpoint of increasing the polishing rate and reducing the surface roughness of the substrate.

The polishing composition of the present invention can be prepared by properly mixing the above-mentioned components.

In the present invention, it is preferable that the polishing composition is prepared through the steps of first elevating the pH of the silica dispersion, which is a raw material of the polishing composition (step (1)), and subsequently lowering the pH of the silica dispersion (step (2)), from the viewpoint of increasing the density of silanol group to the desired range and reducing the nano scratches.

More specifically, the step (1) includes the step of adjusting a pH of a silica dispersion containing colloidal silica having an average particle size of primary particles of 1 nm or more and less than 40 nm (also referred to as "colloidal silica slurry") to a range of from 10 to 14, and from the viewpoint of increasing the silanol groups, adjusting the pH to a range of preferably from 10 to 13, more preferably from 10 to 12. The step (2) includes the step of re-adjusting a pH of the silica dispersion obtained in the step (1) to a range of 1 to 6, and from the viewpoint of increasing the silanol groups, adjusting the pH to a range of preferably from 1 to 4, more preferably from 1 to 2 to give a polishing composition.

In addition, the method for decreasing the silanol groups includes, for example, a method including the step of adding a metal salt such as NaCl, $CaCl_2$, $MgCl_2$, or $AlCl_3$ to a silica dispersion; and a method including the step of heating a silica dispersion.

The polishing composition prepared by the method as described above has an advantage that the polishing composition is especially excellent in the effect for reducing the nano scratches.

As the pH adjusting agent usable in the step (1), there can be used an inorganic base or organic base, such as an aqueous ammonia, sodium hydroxide, potassium hydroxide or hydroxylamine. Among them, the pH adjusting agent is preferably the inorganic base, more preferably an aqueous ammonia, sodium hydroxide and potassium hydroxide, even more preferably sodium hydroxide and potassium hydroxide, from the viewpoint of reducing the nano scratches.

In addition, as the pH adjusting agent usable in the step (2), an inorganic acid or organic acid can be used. Among them, hydrochloric acid, nitric acid, sulfuric acid, phosphoric acid, polyphosphoric acid, glycollic acid, oxalic acid, citric acid, 1-hydroxyethylidene-1,1-diphosphonic acid, aminotri(methylenephosphonic acid), and ethylenediaminetetra(methylenesulfonic acid) are preferable, more preferably hydrochloric acid, nitric acid, sulfuric acid, phosphoric acid, citric acid and 1-hydroxyethylidene-1,1-diphosphonic acid, from the viewpoint of reducing the nano scratches.

As the method for adjusting pH in the step (1) of the present invention, it is preferable that the pH adjusting agent is added to the silica dispersion while stirring the silica dispersion in order to suppress the gelation of the colloidal silica which can take place due to the elevation of the pH. The operating conditions such as the stirring rate or the rate of adding a pH adjusting agent may be adjusted so as to properly suppress the gelation of the colloidal silica. It is preferable that the pH-adjusted silica dispersion in the step (1) is used in the step (2) as quickly as possible from the viewpoint of effectively forming the silanol groups, thereby reducing the nano scratches.

It is preferable that the addition of the pH adjusting agent in the step (2) is terminated after the mixture is continued to stir for a given period of time after reaching the desired pH, and no change in pH is confirmed after, for example, 1 hour. If the pH change is confirmed, the pH adjusting agent is further added, and the above procedures are repeated.

The concentration of each component in the above-mentioned polishing composition may be any concentration during the preparation of the composition and the concentration upon use. In many cases, the polishing composition is usually prepared as a concentrate, which is diluted upon use.

The pH of the polishing composition of the present invention is, for example, preferably 7 or less, more preferably 5 or less, even more preferably 4 or less, even more preferably 3 or less, even more preferably 2.5 or less, even more preferably 2 or less, from the viewpoint of increasing the polishing rate and from the viewpoint of reducing the nano scratches.

Since the polishing composition having the above constitution is used, there can be efficiently manufactured a substrate for precision parts having excellent surface properties such that there are very little nano scratches.

The nano scratches in the present invention refer to fine scratches on a substrate surface having a depth of 10 nm or more and less than 100 nm, a width of 5 nm or more and less than 500 nm, and a length of 100 μm or more. The nano scratches can be detected with an atomic force microscope (AFM), and can be quantitatively evaluated as the number of nano scratches as determined by "MicroMax" a visual testing device as described in Examples set forth below.

In addition, the evaluation method for surface roughness, which is a measure of surface smoothness, is not limited. In the present invention, the surface roughness is evaluated as roughness that can be determined at a short wavelength of 10 μm or less in the AFM (atomic force microscope), and expressed as an average surface roughness (AFM-Ra). Specifically, the surface roughness is obtained according to the method described in Examples set forth below.

The material of a substrate to be polished, which is suitably used in the present invention, includes, for example, metals or metalloids such as silicon, aluminum, nickel, tungsten, copper, tantalum and titanium, and alloys thereof; glassy substances such as glass, glassy carbon and amorphous carbons; ceramic materials such as alumina, silicon dioxide, silicon nitride, tantalum nitride, and titanium carbide; resins such as polyimide resins; and the like. Among them, a substrate to be polished is preferably made of a metal such as aluminum, nickel, tungsten or copper, or made of an alloy containing these metals as the main components. For example, a Ni—P plated aluminum alloy substrate and a glass substrate made of crystallized glass or reinforced glass are more preferable, and a Ni—P plated aluminum alloy substrate is even more preferable.

The shape of the substrate to be polished is not particularly limited. For example, those having shapes containing planar portions such as discs, plates, slabs and prisms, or shapes containing curved portions such as lenses can be subjects for polishing with the polishing composition of the present invention. Among them, disc-shaped substrates to be polished are even more preferable in polishing.

The polishing composition of the present invention can be preferably used in polishing a substrate for precision parts. For example, the polishing composition is suitable for polishing substrates for precision parts, including substrates for recording media such as magnetic disk substrate including memory hard disks and the like, optical disks, and optomagnetic disks; and photomask substrates, optical lenses, optical mirrors, optical prisms, and semiconductor substrates, and the like. Among them, since the polishing composition of the present invention can remarkably reduce the nano scratches important in high density or high integration, the polishing composition is more preferable for polishing a magnetic disk substrate such as a memory hard disk substrate, or a semiconductor substrate, even more preferable for polishing a magnetic disk substrate.

The polishing of a memory hard disk substrate or a semiconductor substrate includes, for example, the steps of polishing a silicon wafer (bare wafer), forming an embedded metal line, subjecting an interlayer dielectric to planarization, forming a film for shallow trench isolation, and forming an embedded capacitor, and the like.

By using the polishing composition of the present invention as mentioned above, the nano scratches of the substrate can be significantly reduced. Accordingly, the present invention relates to a method for reducing the nano scratches of a substrate or a method for manufacturing a substrate.

The method for reducing the nano scratches of a substrate or the method for manufacturing a substrate of the present invention is a method including the step of polishing a substrate to be polished with a polishing composition comprising a colloidal silica prepared from a silicate, the colloidal silica having an average particle size of primary particles of 1 nm or more and less than 40 nm, and water, wherein a density of silanol group on the surface of the colloidal silica is adjusted to a range from 0.06 to 0.3 mmol per 1 g of the colloidal silica.

This polishing step includes the step of polishing the surface of a substrate to be polished by putting the substrate to be polished between polishing platens to which a polishing pad, such as a nonwoven organic polymer-based, polishing pad, is attached, feeding the polishing composition to the surface of the substrate, and moving the polishing platens or the substrate, while applying a given load. The method for determination of a density of silanol group in the polishing composition and the method for adjusting the density include the methods as mentioned above. Also, as the method of feeding the polishing composition in this step, a polishing composition in which each component is mixed before feeding to the substrate surface may be fed, or each component may be fed separately by, for example, adjusting the feeding amount and mixed on the substrate surface so as to give a desired amount of the content of each component.

Here, the conditions such as the feeding rate of the polishing composition, the polishing load, and the rotational speed of the polishing platen or substrate may be within known ranges.

In the method for reducing the nano scratches of a substrate or the method for manufacturing a substrate of the present invention, the surface properties of the substrate to be polished before subjecting to the polishing step are not particularly limited. For example, those substrates having surface properties that the average surface roughness (Ra) is 1 nm or less are preferable.

The above-mentioned polishing step may be preferably carried out in the second or the subsequent step among the plural polishing steps, and it is even more preferable to carry out the polishing step as a final polishing step. In this polishing step, in order to avoid admixing of the abrasive or polishing composition used in the previous step, separate polishing machines may be used. And when the separate polishing machines are used, it is preferable to clean the substrate for each step. Here, the polishing machines are not particularly limited.

The polishing composition of the present invention is especially effective in the polishing step, and the polishing composition can be similarly applied to grinding steps other than this, for example, lapping step, and the like.

The substrate manufactured by using the polishing composition of the present invention or using the method for manufacturing a substrate of the present invention as described above has excellent surface smoothness. For example, those substrates having surface roughness (AFM-Ra) of 0.3 nm or less, preferably 0.2 nm or less, more preferably 0.15 nm or less, even more preferably 0.13 nm or less are obtained.

Also, the manufactured substrate is suitable for a magnetic disk substrate and a semiconductor substrate, because the manufactured substrate has very little nano scratches. Therefore, when the substrate is, for example, a memory hard disk substrate, the substrate can meet the requirement of a recording density of 120 G bits/inch$^2$, preferably 160 G bits/inch$^2$. And when the substrate is a semiconductor substrate, the substrate can meet the requirement of a wire width of preferably 65 nm, and more preferably 45 nm.

EXAMPLES

The following examples further describe and demonstrate embodiments of the present invention. The examples are given solely for the purposes of illustration and are not to be construed as limitations of the present invention.

A Ni—P-plated substrate used as a substrate to be polished was previously roughly polished with a polishing composition containing an alumina abrasive, to adjust the average surface roughness (AFM-Ra) to 1 nm, and polishing was evaluated with an aluminum alloy substrate having a thickness of 1.27 mm, an outer diameter of 95 mm and an inner diameter of 25 mm.

Examples 1 to 9 and Comparative Examples 1 to 4

Each of the polishing compositions having the components shown in Table 1 was prepared. As the colloidal silica, there was used one of the following colloidal silica slurries A to F:
Colloidal silica slurry A (commercially available from Du Pont K.K., aqueous dispersion having a silica concentration of 40% by weight, D90/D50=1.3),
Colloidal silica slurry B (commercially available from Du Pont K.K., aqueous dispersion having a silica concentration of 40% by weight, D90/D50=1.4),
Colloidal silica slurry C (commercially available from Du Pont K.K., aqueous dispersion having a silica concentration of 40% by weight, D90/D50=1.4),
Colloidal silica slurry D (commercially available from Shokubai Kasei Kogyo, aqueous dispersion having a silica concentration of 40% by weight, D90/D50=1.1),
Colloidal silica slurry E (commercially available from Du Pont K.K., aqueous dispersion having a silica concentration of 40% by weight, D90/D50=1.2),
Colloidal silica slurry F (commercially available from Fuso Chemical Co., Ltd., aqueous dispersion having a silica concentration of 13% by weight, D90/D50=1.1), or
Colloidal silica slurry G (commercially available from Du Pont K.K., aqueous dispersion having a silica concentration of 50% by weight, D90/D50=2.5);

a 60% by weight aqueous solution of 1-hydroxyethylidene-1,1-diphosphonic acid (HEDP), 98% by weight sulfuric acid and/or citric acid, and a 35% by weight aqueous hydrogen peroxide as other component were added together, to give a polishing composition. Here, the balance was ion-exchanged water.

On the other hand, as shown in Table 1, a polishing composition was prepared using a fumed silica slurry A (commercially available from Nippon Aerosil, D90/D50=1.1) as the fumed silica, and a 60% by weight aqueous HEDP solution. The balance was ion-exchanged water.

Here, the colloidal silica slurries A to E, and G were obtained by the silicate method, the colloidal silica slurry F was obtained by the alkoxysilane method, and the fumed silica slurry A was obtained by the dry method.

The order of mixing each of the components in Examples 1 to 9 and Comparative Examples 1, 3 and 4 was as follows: The aqueous hydrogen peroxide was added to an aqueous solution prepared by diluting a mixture of HEDP and sulfuric acid or citric acid with water, and thereafter adding the remaining components to the mixture and mixing the components. The resulting mixture was gradually added in a small amount to a colloidal silica slurry while stirring, to give each of the polishing compositions.

On the other hand, the order of mixing each of the components of Comparative Example 2 was as follows. The 60% by weight aqueous HEDP solution was further diluted with a half the volume of the balance of ion-exchanged water, and the resulting aqueous solution was gradually added in a small amount to a dispersion prepared by dispersing the fumed silica slurry A in the remaining half volume of ion-exchanged water while stirring, to give a polishing composition.

Example 10

A 1 N aqueous sodium hydroxide solution (commercially available from Sigma-Aldrich Japan, factor 0.999) was added dropwise to a colloidal silica slurry B while stirring so that gelation of the colloidal silica does not take place, to give a silica dispersion having a pH of 10.0 (step (1)). While stirring this silica dispersion, a mixture of a 60% by weight aqueous HEDP solution, 98% by weight sulfuric acid and ion-exchanged water was added thereto in the given amounts shown in Table 1, to give a polishing composition having a pH of 1.5 (step (2)).

Example 11

The same procedures as in Example 10 were carried out except that the pH of the silica dispersion was adjusted to 12.0, to give a polishing composition.

Example 12

The same procedures as in Example 10 were carried out except that the colloidal silica slurry G was used in place of the colloidal silica slurry B, to give a polishing composition.

Example 13

The same procedures as in Example 10 were carried out except that the colloidal silica slurry G was used in place of the colloidal silica slurry B, and that the pH of the silica dispersion was adjusted to 12.0, to give a polishing composition.

The density of silanol groups, the polishing rate, the nano scratches, the AFM-Ra for each of the polishing compositions obtained in Examples 1 to 13 and Comparative Examples 1 to 4 were determined and evaluated in accordance with the following methods. The results are shown in Table 2. In addition, the content of metal element derived from the colloidal silica, the average particle size of the primary particles of the silica, and the content of the metal element in the polishing composition are also shown in Table 2.

1. Determination Conditions for Density of Silanol Groups
   Potentiometer: commercially available from KYOTO ELECTRONICS MANUFACTURING CO., LTD., Potentiometric Automatic Titrator "AT-310J"
   Titration reagent: 0.01 N aqueous hydrochloric acid solution
   Dripping rate of the titration reagent: 0.03 ml/minute
   Determination sample: Each of the polishing compositions of Examples 1 to 13 and Comparative Examples 1 to 4 was diluted with ion-exchanged water so as to have a silica concentration of 0.2% by weight, to be used as a determination sample.

2. Polishing Conditions

Polishing processing machine: double-sided 9B polishing machine, commercially available from SPEEDFAM CO., LTD.

Polishing pad: a polishing pad, commercially available from FUJIBO (thickness: 0.9 mm, pore size: 30 μm)

Rotational speed of a platen: 32.5 r/min

Flow rate for a polishing composition: 100 mL/min

Polishing time period: 4 minutes

Polishing pressure: 7.8 kPa

Number of substrates introduced: 10

3. Determination Conditions for Polishing Rate

The polishing rate of both the sides per unit time (μm/min) was calculated by dividing a weight difference (g) before and after the polishing test by the density (8.4 g/cm$^3$) of Ni—P, and further dividing the resultant quotient by the surface area (131.9 cm$^2$) of the disk and the polishing time period.

4. Determination Conditions for Nano Scratches

Measurement equipment: "MicroMax VMX-2100CSP" (commercially available from VISION PSYTEC CO., LTD.)

Light source: 2Sλ (250 W) and 3Pλ (250 W) being both 100%

Tilt angle: −6°

Magnification: maximum (scope of vision: 1/120 of the entire area)

Observed range: entire area (a substrate having an outer diameter of 95 mm and an inner diameter of 25 mm)

Iris: notch

Evaluation: Four pieces of substrates were randomly selected from 10 substrates introduced into the polishing machine, and a total of the number of nano scratches on each of both sides of the four substrates was divided by 8 to calculate the number of nano scratches per side of the substrate (nano scratches/side). Also, the number of nano scratches shown in the table was evaluated relative to the number of nano scratches of Comparative Example 1 (240 nanoscratches/side).

5. Determination Conditions for AFM-Ra

Measurement equipment: "TM-M5E" commercially available from Veeco

Mode: non-contact

Scan rate: 1.0 Hz

Scan area: 10×10 μm

Evaluation: Determinations for the AFM-Ra were taken on three areas on each of both the sides per one disk evenly in a circumferential direction at the equidistance from both the inner circumference and the outer circumference of the disk for a total of 6 points, and an average of the determinations was defined as the average surface roughness.

6. Determination of Content of Metal Elements

A polishing composition, a silica slurry or a silica was heated and calcified, and thereafter an aqueous hydrofluoric acid was added thereto to further thermally decompose the polishing composition or the like. The residue consequently obtained was dissolved in water, and the metal elements of the solution were quantified according to ICP (high-frequency inductively coupled plasma) emission spectroanalysis.

7. Average Particle Size of Primary Particles of Silica

Silica particles in a slurry state used in the preparation of the polishing composition were used as a sample, and the sample was observed and its TEM image was photographed with a transmission electron microscope commercially available from JEOL, Ltd. "JEM-2000FX" (80 kV, magnification: 10000 to 50000) in accordance with the instruction manual of the microscope attached by the manufacturer. The photographs were incorporated into a personal computer as image data with a scanner connected thereto. The projected area diameter of each silica particle was determined using an analysis software "WinROOF" (commercially available from MITANI CORPORATION), and defined as the diameter of the silica particles. After analyzing data for 2500 or more silica particles, the volume of the silica particles were calculated from the diameters of the silica particles based on the analyzed data using a spreadsheet software "EXCEL" (commercially available from Microsoft Corporation).

Based on the particle size distribution data of the silica particles obtained in the manner described above, the ratio of the particles having a given particle size (% by volume basis) in the entire particles is expressed as a cumulative frequency counted from a smaller particle size, to obtain a cumulative volume frequency (%), and a particle size at the cumulative volume frequency of 50% (D50) is obtained. This D50 is defined as an average particle size of the primary particles. Here, the particle size of one primary particle employs an arithmetic mean of breadth and length (an average of length and breadth).

TABLE 1

| | Composition of Polishing Composition (% by weight)[1)] | | | | | | | | | | | |
|---|---|---|---|---|---|---|---|---|---|---|---|---|
| | Silica | | | | | | | | | | | |
| | | | | | | | Alkoxy- | | Acid | | | |
| | | | | | | | silane | Dry | Organic | In- | | |
| | Silicate Method | | | | | | Method | Method | | organic | Other | |
| | Colloidal | Colloidal | Colloidal | Colloidal | Colloidal | Colloidal | Colloidal | Fumed | Acid | Acid | CompoNents | |
| | Silica Slurry A | Silica Slurry B | Silica Slurry C | Silica Slurry D | Silica Slurry E | Silica Slurry G | Silica Slurry F | Silica Slurry A | HEDP | Citric Acid | Sulfuric Acid | Hydrogen Peroxide | pH |
| Ex. 1 | 7 | | | | | | | | 2 | | | | 1.5 |
| Ex. 2 | | 7 | | | | | | | 0.13 | | 0.55 | | 1.5 |
| Ex. 3 | | 7 | | | | | | | 2 | | | | 1.5 |
| Ex. 4 | | | | 7 | | | | | 2 | | | 0.6 | 1.5 |
| Ex. 5 | | | | | 7 | | | | 2 | | | | 1.5 |
| Ex. 6 | 7 | | | | | | | | | 0.67 | | | 1.5 |
| Ex. 7 | | | | | | | 7 | | 0.13 | | 0.55 | | 1.5 |
| Ex. 8 | | | | | | | 7 | | 0.24 | | | | 3 |
| Ex. 9 | | | | | | | 7 | | 0.18 | | | | 5 |

TABLE 1-continued

| | Composition of Polishing Composition (% by weight)[1] | | | | | | | | | | | |
|---|---|---|---|---|---|---|---|---|---|---|---|---|
| | Silica | | | | | | | | | | | |
| | Silicate Method | | | | | | Alkoxy-silane Method | Dry Method | Acid | | Other CompoNents | |
| | Colloidal Silica Slurry A | Colloidal Silica Slurry B | Colloidal Silica Slurry C | Colloidal Silica Slurry D | Colloidal Silica Slurry E | Colloidal Silica Slurry G | Colloidal Silica Slurry F | Fumed Silica Slurry A | Organic Acid HEDP | Inorganic Acid | | |
| | | | | | | | | | | Citric Acid | Sulfuric Acid | Hydrogen Peroxide | pH |
| Ex. 10 | | 7 | | | | | | | 0.13 | | 0.55 | | 1.5 |
| Ex. 11 | | 7 | | | | | | | 0.13 | | 0.55 | | 1.5 |
| Ex. 12 | | | | | | 7 | | | 0.13 | | 0.55 | | 1.5 |
| Ex. 13 | | | | | | 7 | | | 0.13 | | 0.55 | | 1.5 |
| Comp. Ex. 1 | | | | | | | 7 | | 2 | | | | 1.5 |
| Comp. Ex. 2 | | | | | | | | 7 | 2 | | | | 1.5 |
| Comp. Ex. 3 | | | | 7 | | | | | 2 | | | | 1.5 |
| Comp. Ex. 4 | | | | | 7 | | | | 2 | | | | 1.5 |

[1] Balance being ion-exchanged water

TABLE 2

| | Density of Silanol Groups (mmol/g) | Content of Metal Elements in Polishing Composition (% by weight) | Content of Metal Elements Derived from Colloidal Silica (% by weight) | | Average Particle Size of Primary Particles of Silica (nm) | Nano Scratches (Relative Value) | AFM-Ra (nm) | Polishing Rate (μm/min) |
|---|---|---|---|---|---|---|---|---|
| | | | All Metals | Total of Na and K | | | | |
| Ex. 1 | 0.17 | 0.035 | 0.035 | 0.03 | 22 | 0.17 | 0.16 | 0.14 |
| Ex. 2 | 0.08 | 0.025 | 0.025 | 0.02 | 19 | 0.5 | 0.13 | 0.14 |
| Ex. 3 | 0.08 | 0.025 | 0.025 | 0.022 | 19 | 0.5 | 0.13 | 0.14 |
| Ex. 4 | 0.08 | 0.025 | 0.025 | 0.022 | 15 | 0.67 | 0.12 | 0.15 |
| Ex. 5 | 0.08 | 0.025 | 0.025 | 0.022 | 15 | 0.67 | 0.12 | 0.13 |
| Ex. 6 | 0.17 | 0.035 | 0.035 | 0.03 | 22 | 0.17 | 0.15 | 0.14 |
| Ex. 7 | 0.10 | 0.021 | 0.021 | 0.017 | 28 | 0.22 | 0.18 | 0.25 |
| Ex. 8 | 0.10 | 0.021 | 0.021 | 0.017 | 28 | 0.37 | 0.18 | 0.17 |
| Ex. 9 | 0.10 | 0.021 | 0.021 | 0.017 | 28 | 0.85 | 0.18 | 0.1 |
| Ex. 10 | 0.10 | 0.039 | 0.025 | 0.02 | 19 | 0.41 | 0.13 | 0.14 |
| Ex. 11 | 0.17 | 0.078 | 0.025 | 0.02 | 19 | 0.34 | 0.13 | 0.14 |
| Ex. 12 | 0.12 | 0.035 | 0.021 | 0.017 | 28 | 0.08 | 0.18 | 0.25 |
| Ex. 13 | 0.21 | 0.068 | 0.021 | 0.017 | 28 | 0.15 | 0.18 | 0.25 |
| Comp. Ex. 1 | 0.08 | <0.001 | <0.001 | <0.001 | 15 | 1 | 0.13 | 0.07 |
| Comp. Ex. 2 | 0.005 | <0.001 | <0.001[1] | <0.001[1] | 15 | 30.8 | 0.45 | 0.02 |
| Comp. Ex. 3 | 0.04 | 0.020 | 0.020 | 0.018 | 15 | 10.4 | 0.12 | 0.13 |
| Comp. Ex. 4 | 1.02 | 0.010 | 0.010 | 0.005 | 15 | 12.5 | 0.32 | 0.14 |

[1] Metal elements derived from the fumed silica.

It can be seen from the results shown in Table 2 that the substrates obtained by polishing with the polishing compositions obtained in Examples 1 to 13 suppressed the generation of nano scratches and reduced surface roughness as compared to those obtained in Comparative Examples 1 to 4.

The polishing composition of the present invention is suitable for polishing substrates for precision parts including, for instance, substrates for recording media, such as magnetic disks, optical disks, and opto-magnetic disks, photomask substrates, optical lenses, optical mirrors, optical prisms and semiconductor substrates, and the like.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for preparing a polishing composition for a Ni—P plated aluminum alloy substrate comprising a colloidal silica prepared from a silicate, said composition being prepared by a method comprising the steps of:
    (1) adjusting the pH of a silica dispersion comprising colloidal silica, having an average particle size of primary particles of 1 nm or more and less than 40 nm, to a range of from 10 to 12 in order to increase a density of silanol groups formed on the surface of the colloidal silica;
    (2) re-adjusting the pH of the silica dispersion obtained in the step (1) to a range of from 1 to 4; and
    wherein the density of silanol groups is from 0.06 to 0.3 mmol per 1 g of the colloidal silica and said polishing composition has a pH of 1 to 4.

2. The process of claim 1 wherein the colloidal silica of step (1) further comprises at least one or more metal elements selected from the group consisting of an alkali metal and an alkaline earth metal in an amount of from 0.001 % to 2 % by weight of the polishing composition.

3. The process of claim 1 wherein the colloidal silica of step (1) further comprises at least one or more metal elements selected from the group consisting of an alkali metal and an alkaline earth metal in an amount of from 0.001% to 0.2% by weight of the polishing composition, and wherein the metal elements are derived from the preparation of the colloidal silica.

4. The process according to claim 1, wherein the pH of the silica dispersion is re-adjusted to a range of from 1 to 2 in the step (2).

5. A process for manufacturing a Ni—P plated aluminum alloy substrate comprising polishing said substrate with a polishing composition prepared by the process as defined in claim 1.

* * * * *